324/77 SEARCH ROOM

April 5, 1966 A. W. BARBER 3,245,001

COMPLEX WAVE GENERATOR

Filed Dec. 11, 1963 4 Sheets-Sheet 1

INVENTOR.

Alfred W. Barber

COMPLEX WAVE GENERATOR

Filed Dec. 11, 1963

INVENTOR.

Alfred W. Barber

April 5, 1966 A. W. BARBER 3,245,001

COMPLEX WAVE GENERATOR

Filed Dec. 11, 1963 4 Sheets-Sheet 3

INVENTOR.

Alfred W. Barber

April 5, 1966 A. W. BARBER 3,245,001

COMPLEX WAVE GENERATOR

Filed Dec. 11, 1963 4 Sheets-Sheet 4

INVENTOR.

BY Alfred W. Barber 3,245,001

COMPLEX WAVE GENERATOR

Alfred W. Barber, Bayside, N.Y.
(32—44 Francis Lewis Blvd., Flushing, N.Y.)

Filed Dec. 11, 1963, Ser. No. 329,700
13 Claims. (Cl. 331—52)

The present invention concerns Complex Wave Generators and, in particular, generators for supplying signals consisting of fundamental and phase and amplitude controlled harmonics.

Alternating current electrical signals may be analyzed in terms of a component of some fundamental or base frequency and components consisting of harmonics of this fundamental frequency having various phase and amplitude relationships to the fundamental. One classical treatment of the subject is known as the Fourier series analysis. A "square wave," for example, can be expressed in accordance with the Fourier Analysis as a fundamental and a series of decreasing amplitude odd harmonics in predetermined phase relationship with the fundamental. A "triangular wave" is a similar series but with a different phase relationship. To be able to create these waves in a simple and direct manner is useful for teaching purposes and for analyzing systems operations and in other ways.

Perhaps the most obvious manner of creating a complex wave is to start with a wave of fundamental frequency, multiply the frequency to provide the harmonic waves, to control the phase and amplitude of the various harmonic waves and to combine all the components to provide a desired output wave. One method of accomplishing the above is described in an article in Electronics, September 1952, pp. 132–135. However, the device described not only utilizes vacuum tubes but is large, cumbersome and expensive.

It has been found according to the present invention that superior results can be achieved and at a great saving in a size and in cost by using a series of transistor oscillators operating in harmonic relationship. One of the oscillators acts as the fundamental component generator and the other oscillators are locked in frequency with it while permitting variations in the phases. Since an oscillator takes the place of a frequency multiplier and several stages of frequency selection, it has been found that this new method of providing the frequency components of the wave is particularly useful using transistors as will be evident from the detailed description of the invention given below.

Accordingly one object of the present invention is to provide methods of and means for generating a complex wave made up of a fundamental and a series of harmonics in which the amplitude of the individual harmonics and their individual phases can be varied at will.

Another object is to provide such a complex wave generator with both a high frequency and a low frequency output.

A further object is to provide a simple and effective locked-oscillator circuit for a complex wave generator.

A still further object is to provide simple methods of and means for improving the wave-form in complex wave generators.

Still another object is to provide a complex wave generator in which transistors can be used to advantage.

These and other objects of the present invention will be apparent from the detailed description of the invention given in connection with the various figures of the drawing.

Figure 1:
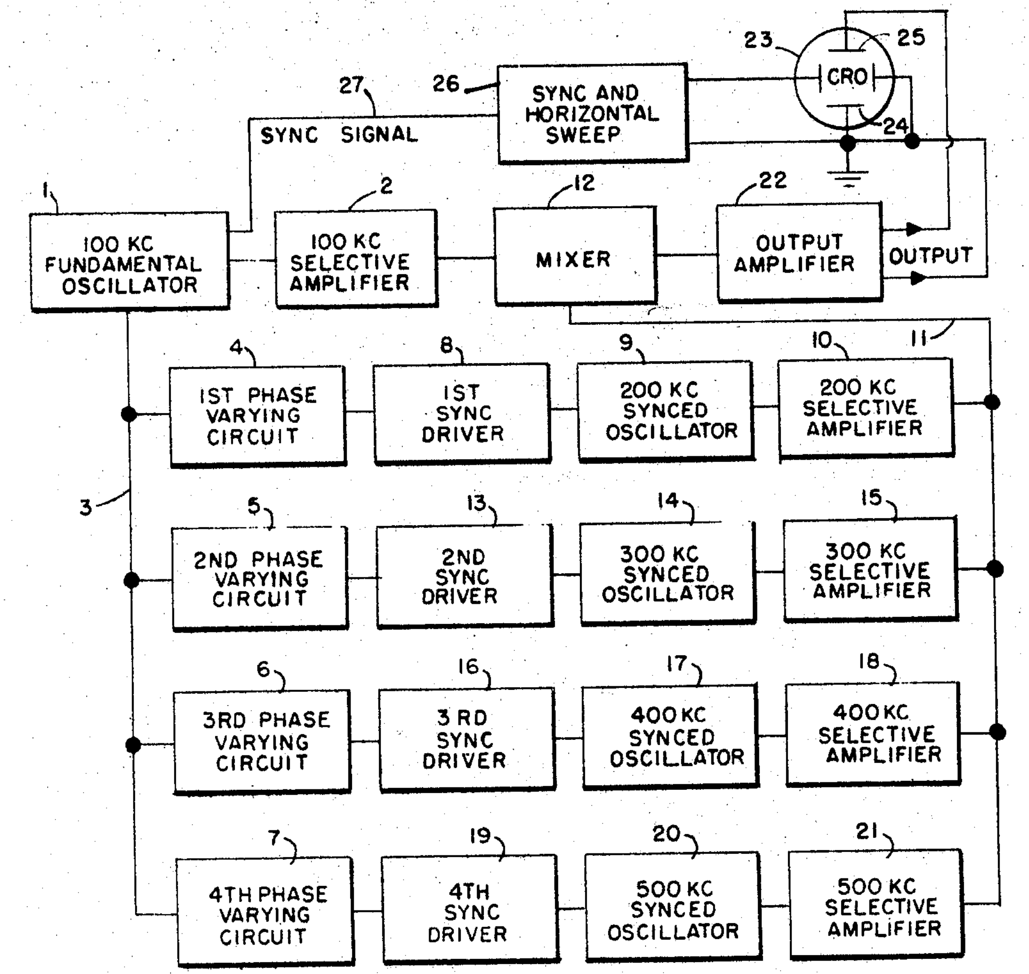
FIGURE 1 is a block diagram of a complex wave generator in accordance with the present invention.

FIG. 1 is a block diagram of a complex wave generator in accordance with the present invention in which for purposes of illustration with no intention of making specific limitations as to frequency, number of harmonics or range in other dimensions, an oscillator 1 of fixed frequency of 100 kilocycles provides a 100 kilocycle output signal to a selective amplifier 2 and to a harmonic feed line 3. The harmonic line 3 feeds 1st phase varying circuit 4, 2nd phase varying circuit 5, 3rd phase varying circuit 6 and 4th phase varying circuit 7. The 1st phase varying circuit receives a 100 kilocycle signal and changes its phase a predetermined adjustable amount. The phase change to be provided is in terms of a particular harmonic, for example, the second which is equal to phase change in the fundamental divided by the order of the harmonic, in the case of the 2nd harmonic by two. A control on the phase change circuit (see FIGS. 2 and 3) may be calibrated in degrees of phase shift of the resultant wave. The phase shifted 2nd harmonic designated signal is amplified in 1st sync driver 8 to a level suitable for synchronizing and locking in frequency and phase a 2nd harmonic frequency oscillator in the form of a 200 kilocycle oscillator 9. The phase controlled signal from the 200 kilocycle phase and frequency locked oscillator 9 feeds the 200 kilocycle selective amplifier 10 which selects the 200 kilocycle signal and substantially eliminates the fundamental and other extraneous and undesired signals. The phase controlled, frequency locked 200 kilocycle signal selected and amplified to suitable level is applied over line 11 to mixer 12. This completes the path and operations on one of the harmonic signals up to the mixer where the fundamental and all the phase controlled harmonic signals are combined.

In a similar manner any number of additional harmonic components of controlled phase may be added in the mixer 12. For example, the 2nd phase varying circuit 5 provides phase control and variation in terms of the 3rd harmonic of the 100 kilocycle signal from oscillator 1. The phase controlled signal from the phase varying circuit 5 is amplified by 2nd sync driver 13 and applied to synchronize in frequency and phase the 300 kilocycle oscillator 14. The 300 kilocycle synchronized oscillator signal from oscillator 14 is amplified and selected by selective amplifier 15 and also applied over line 11 to mixer 12.

Similarly, signals from oscillator 1 over line 3 are phase changed in 3rd phase varying circuit 6 and applied to sync driver 16 which in turn provides a phase controlled synchronizing signal to the 400 kilocycle oscillator 17. The phase controlled signals from oscillator 17 are selected and amplified by selective amplifier 18 and similarly applied to mixer 12 over line 11.

Also, in a similar manner, signals from oscillator 1 over line 3 are phase changed in 4th phase varying circuit 7 and applied to sync driver 19 which in turn provides a phase controlled synchronizing signal to the 500 kilocycle oscillator 20. The phase controlled signals from oscillator 20 are selected and amplified by selective amplifier 21 and applied to mixer 12 over line 11.

The amplitude of the fundamental and the individual harmonics are independently controlled by suitable means as by gain control means form a part of selective amplifiers 2, 10, 15, 18 and 21.

Any reasonable number of additional harmonics may be added in a similar manner. To reiterate, the present invention combines a redetermined phase varying circuit coupled to the source of fundamental signals, a synchronized oscillator driver, a synchronizable oscillator, a selective amplifier with gain control means for selecting the oscillator signals, coupling means to a mixer for the various phase controlled harmonic components and an output amplifier to deliver the complex wave to a utilization means such as a cathode ray oscilloscope.

The most usual utilization of the complex wave provided by the combination of the present invention is visual observation on an oscilloscope. The combined signals from mixer 12 are amplified to a suitable level in amplifier 22 and are then applied to the vertical deflecting plates 24–25 of cathode ray oscilloscope tube 23. In order to observe any predetermined number of complete cycles of the complex wave, the horizontal deflection of the cathode ray oscilloscope tube is supplied with horizontal sweep deflection voltage by sweep generator 26 which is synchronized to the fundamental 100 kilocycle oscillator by means of a sync signal supplied over lead 27.

Figure 2:
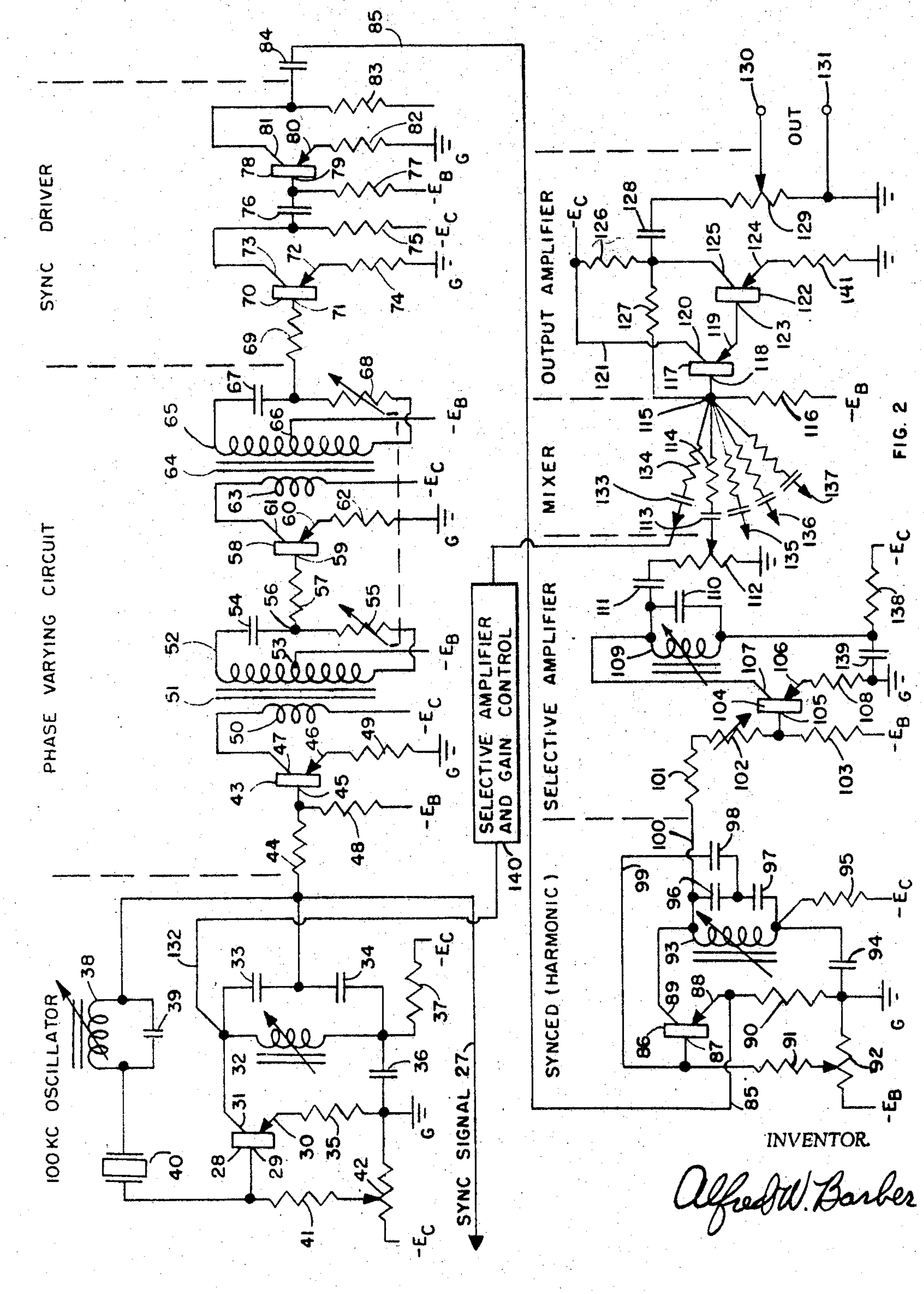
FIGURE 2 is a schematic circuit diagram of one of the harmonic channels adapted for use in the present invention.

FIG. 2 is a schematic circuit diagram of a 100 kilocycle fundamental frequency oscillator and one typical harmonic channel suitable for use in the complex wave generator in accordance with the present invention. The 100 kilocycle oscillator includes transistor 28 with its emitter 30 returned to ground G through a self-bias resistor 35, its collector 31 connected to a 100 kilocycle tuned tank circuit including adjustable coil 32 tuned to 100 kilocycles by capacitors 33 and 34 in series, and its base 29 returned to an adjustable bias provided by potentiometer 42 and through base resistor 41. The collector bias $E_C$ is supplied through decoupling resistor 37 which is by-passed by capacitor 36. Oscillation is produced by feeding back the signal voltage across capacitor 34 through the tuned circuit made up of adjustable inconductor 38 in parallel with capacitor 39 and crystal 40 to base 29. The frequency of oscillation is essentially determined by crystal 40 but a small adjustment may be made by varying the tuning and hence the equivalent series impedance of tuned circuit 38–39.

Following the 100 kilocycle fundamental frequency oscillator there is provided a phase varying circuit utilizing transistors 43 and 58. Each of these transistors acts as an amplifier feeding a two stage variable phase shift network. Transistor 43 includes emitter 46 returned to ground G through self-bias resistor 49, base 45 receiving signals from the 100 kilocycle oscillator through resistor 44 and steady bias $E_B$ through resistor 48 and collector 47 feeding a transformer 50–51–52 and receiving bias from collector bias source $E_C$. The transformer primary 50 receives amplified 100 kilocycle signals from collector 47 and provides an output across the outer ends of secondary 52. Secondary 52 is bridged by a phase shift network consisting of capacitor 54 in series with variable resistor 55. The output taken between points 53 and 56 will be a signal the phase of which can be varied by varying the value of variable resistor 55. This phase varied signal is applied through resistor 57 to base 59 of transistor 58. Transistor 58 acts as an amplifier and feeds a second phase shift network similar to the one just described. Transistor 58 includes an emitter 60 returned to ground G through self-bias resistor 62, base 59 receiving signals as described above and bias from $E_B$ applied at secondary top 53 and through the lower half of secondary 52, resistors 55 and 57, and collector 61 feeding primary 63 of the second phase shift network. This second phase shift network is similar to the one described above including transformer 63–64–65, capacitor 67 and variable resistor 68. The signal from this second phase shift network is shifted by the sum of the shifts of the two networks and is applied to base 71 of transistor 70 through resistor 69. Base bias $E_B$ is applied to tap 66 of secondary 65. For convenience the two phase shift resistors 55 and 68 may be mechanically ganged as indicated by the dotted line.

After the signal has been shifted, it is amplified by two transistor amplifier stages utilizing transistors 70 and 78. The first stage includes transistor 70 having an emitter 72 returned to ground G through self-bias resistor 74, a base 71 receiving the phase shifted signal through resistor 69 and collector 73 returned to collector bias source $E_C$ through load resistor 75. The amplified signals across load resistor 75 are applied to base 79 of the second stage transistor 78 through coupling capacitor 76. Base 79 is returned to base bias $E_B$ through resistor 77. Emitter 80 is returned to ground through resistor 82. Collector 81 is returned to collector bias source $E_C$ through collector load resistor 83. The amplified signal at base 79 will be a signal of sufficient magnitude to cause limiting action in transistor 78 by driving it either to collector current cut-off or in the other direction to saturation in order to provide a substantially constant amplitude signal at collector 81 and one containing substantial harmonics. This signal is utilized for synchronizing the harmonic oscillator which constitutes the next stage in the series.

The synced harmonic oscillator which operates at N times the frequency of the 100 kilocycle fundamental oscillator utilizes transistor 86 and receives synchronizing signals from collector 81 through capacitor 84 and over lead 85 on emitter 88. Oscillator transistor 86 includes emitter 88 returned to ground through resistor 90, base 87 returned to a variable base bias provided by potentiometer 92 through resistor 91 and collector 89 connected through tank coil 93 and decoupling resistor 95 to collector bias source $E_C$. Decoupling resistor 95 is by-passed by capacitor 94. Oscillator tank 93 is turned to the desired harmonic oscillation frequency by capacitors 96 and 97 in series. Feed-back to provide regeneration at the desired harmonic frequency is provided by returning the signal voltage across capacitor 97 through capacitor 98 and over connection 99 to base 87. The feed-back so provided in conjunction with the synchronizing signals over lead 85 cause transistor 86 to oscillate in locked condition at an exact multiple of the 100 kilocycle or fundamental frequency. The locking is sufficiently tight so that the phase may be shifted as described above without breaking sync. The phase controlled frequency locked harmonic signal is thus provided at collector 89.

The harmonic signal at collector 89 may contain distortion components at least in part due to the synchronizing signals applied to base 87. These harmonic signals are applied over lead 100 and through resistors 101 and 102 to base 105 of the selective amplifier transistor 104 which provides means for selecting the desired harmonic signal and substantially reducing any distortion components. This selective stage transistor includes emitter 106 returned to ground through resistor 108, base 105 receiving signals as set forth above and bias through resistor 103 and collector 107 returned to the collector bias source $E_C$ through adjustable inductor 109 and decoupling resistor 138 by-passed by capacitor 139. The collector load inductor is tuned to the desired harmonic signal frequency by capacitor 110 and the circuit may be accurately adjusted by varying inductor 109. The distortion free harmonic signal thus provided is applied to gain control means in the form of potentiometer 112 through blocking capacitor 111. The adjustable resistor 102 in series with base 105 provides means for equalizing the gain in the channel to a standard value and to match the gain or signal output of the other channels in the system. The signal from collector 107 is combined with the fundamental and the other harmonic signals provided by channels similar to the one described above in a mixer stage utilizing transistor 117.

The mixer transistor 117 includes a base 118 receiving the selected harmonic signal from the channel just described through coupling capacitor 113 and decoupling resistor 114. Bias is supplied through resistor 116. The fundamental component to the mixer is provided from tank 32–33–34 over lead 132 and through a selective amplifier tuned to the fundamental and a gain control 140. This selective amplifier and gain control are similar to the harmonic selective amplifier described above but tuned to the fundamental frequency. The distortion-free and gain controlled fundamental frequency component is applied through coupling capacitor 133 and decoupling resistor 134 to base 118 where it combines with the various phase shifted harmonic signals. Other harmonic signals provided over channels similar to the one described in detail above are also applied to base 118 by applying them to points 135, 136 and 137 respectively. The composite signal at base 118 consists of amplitude controlled fundamental signal and phase controlled and amplitude controlled synchronous harmonic signals. The balance of the system consists of a low distortion output coupling amplifier utilizing transistor 122.

The output amplifier transistor 122 includes emitter 124 returned to ground through resistor 141, base 123 directly connected to emitter 119 and collector 125 connected through load resistor 126 to the collector bias $E_C$. Collector 120 is directly connected to bias $E_C$. A feedback resistor 127 for distortion reduction purposes is connected from collector 125 to base 118. Output is taken through blocking capacitor 128 to potentiometer 129. The final output is varied by the tap on potentiometer 129 to terminal 130 and between this and ground terminal 131.

Figure 3:
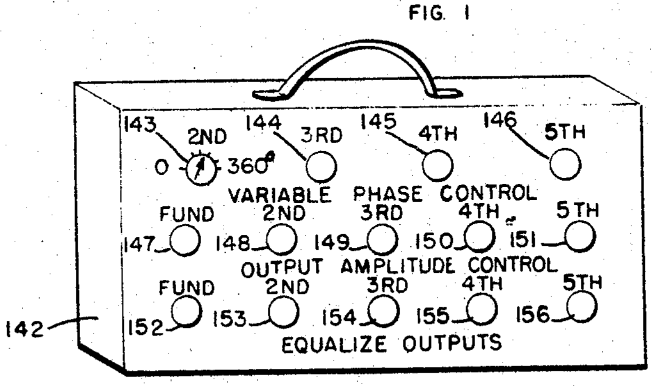
FIGURE 3 is a perspective view of a complete complex wave generator in accordance with the present invention.

FIG. 3 is a perspective view of a complete complex wave generator contained in a suitable case 142. Equalization controls of the fundamental and harmonics are shown as 152, 153, 154, 155 and 156. The output amplitude controls are 147, 148, 149, 150 and 151 respectively while the phase controls for the harmonic components are 143, 144, 145 and 146 respectively.

Figure 4:
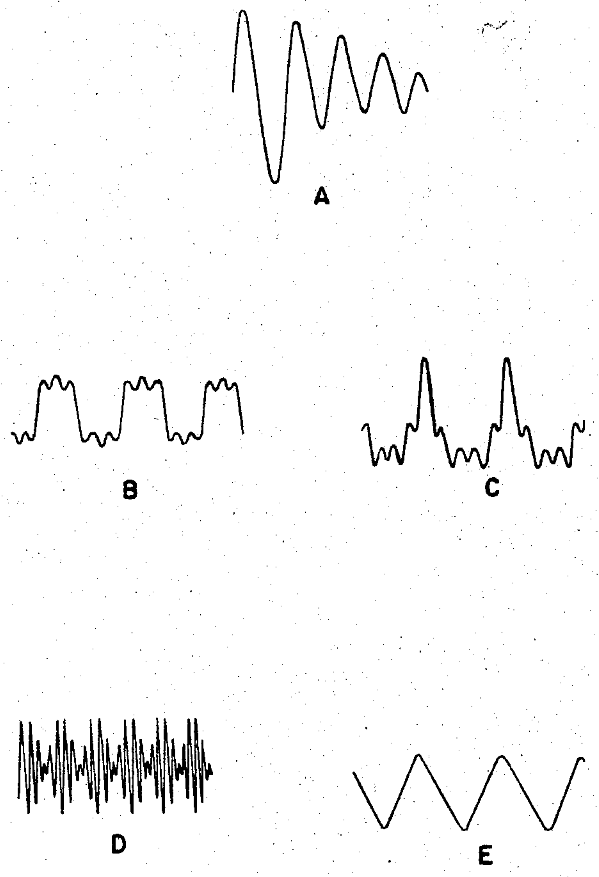
FIGURE 4 is a series of typical waveforms provided by the apparatus of the present invention.

FIG. 4 shows five out of the virtually unlimited waveforms which may be generated and displayed by the complex wave form generator of the present invention. The wave-form A simulates a damped wave while waveform B is a square wave but with an excess of fifth harmonic component. The wave-form E is a triangular wave while C and D are other wave forms which may be produced by the equipment in accordance with the present invention.

While only a few forms of the present invention have been shown and described, many modifications will be apparent to those skilled in the art and within the spirit and scope of the invention as particularly set forth in the appended claims.

Figure 5:
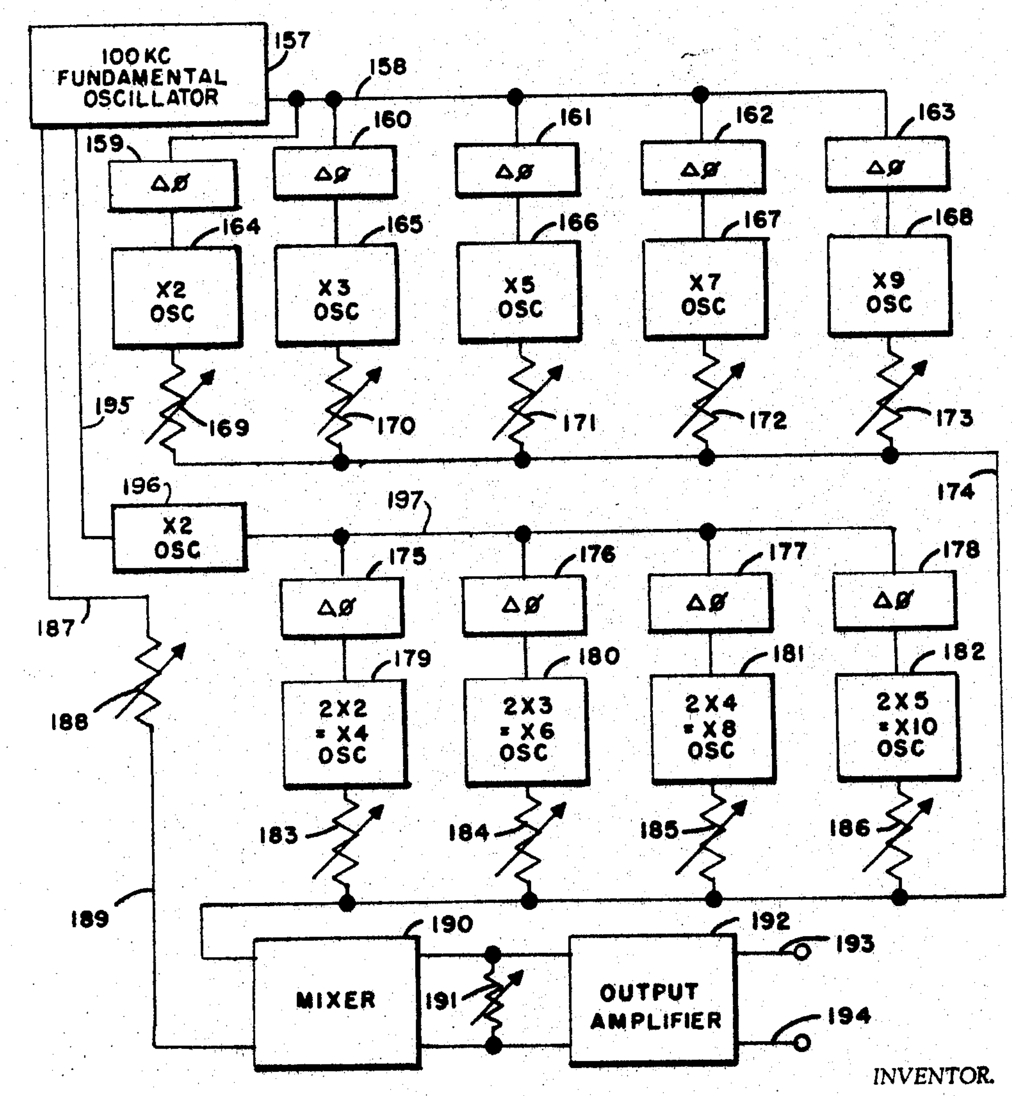
FIGURE 5 is a block diagram of a modification of the present invention permitting extension to very high order of harmonic components.

FIG. 5 is a block diagram of a complex wave generator providing a fundamental and harmonics from the second through the tenth. The technique used here may readily be used to provide harmonics to any reasonable order. Here, the fundamental oscillator 157 provides an output signal over line 158 which is applied to phase shifters 159, 160, 161, 162 and 163. The phase shifted signals from these phase shifters are shifted $\phi/N$ where N is the order of the harmonic. The phase shifted signals are used, as described in detail above, to syncronize in phase-locked condition the oscillators 164, 165, 166, 167 and 168 nominally operating at 2nd, 3rd, 5th, 7th and 9th harmonic frequencies. These oscillators supply output signals which are individually amplitude controlled by suitable gain control resistors 169, 170, 171, 172 and 173 respectively and the composite signal is applied over line 174 to mixer 190. Still other harmonics are provided by means of the frequency multiplier locked oscillator 196 receiving a fundamental frequency input over line 195 and providing a second harmonic output over line 197. This multiplication is to be carried out under phase-lock conditions and in fixed phase relationship with the fundamental. The second harmonic signal on line 197 is applied to phase shifters 175, 176, 177 and 178 where it is shifted $\phi/2N$ where N is the subsequent multiplication factor. The phase shifted signals are applied to locked oscillators 179, 180, 181, and 182 respectively where further multiplications of 2, 3, 4 and 5 respectively take place providing total or composite multiplications of 4, 6, 8 and 10 respectively. The output signals from these multiplying oscillators are amplitude controlled by gain control variable resistors 183, 184, 185 and 186 and applied over line 174 to mixer 190. The fundamental component for the final complex signal is supplied to mixer 190 over lines 187 and 189 and is amplitude controlled by gain control variable resistor 188. The complex wave now composed of phase and amplitude controlled components of fundamental frequency and harmonics 2 through 10 after mixing in mixer 190 is applied to gain control 191 and output amplifier 192 from which it is available to a utilization means at output terminals 193 and 194.

The method of further multiplication as shown in FIG. 5 and described above may be extended again by, for example, using a further auxiliary multiplying oscillator to multiply 5 times and with suitable phase shifts and gain controls provide 5×3, 5×4, 5×5 etc.

While the present invention has been shown and described as a wave display system, complex wave audio signals may be generated by supplying a series of similar frequency multiplying oscillators at fixed phase and amplitude, mixing the fixed with the variable phase signals and detecting the resultant to provide audio output signals as described in the above referenced magazine article.

While only a few forms of the present invention have been shown and described, many modifications will be apparent to those skilled in the art and within the spirit and scope of the invention as set forth in particular in the appended claims.

What is claimed is:

1. A complex wave generator including, in combination a source of fundamental frequency signal, a plurality of oscillators adapted to oscillate at frequencies substantially equal to integral multiples of said fundamental frequency, a plurality of means coupled to said source of fundamental frequency and adapted to independently vary the phases of portions of said fundamental frequency signals, means for applying said phase varied portions of said fundamental frequency signals to said oscillators for synchronizing said oscillators, and means for combining portions of said synchronized oscillator signals and said fundamental frequency signal to provide a complex wave output.

2. A complex wave generator as set forth in claim 1 wherein said source of fundamental frequency signals comprises a crystal controlled transistor oscillator.

3. A complex wave generator as set forth in claim 1 wherein at least one of said phase varying means comprises two stages of transistor amplifiers feeding mechanically ganged phase varying variable resistors.

4. A complex wave generator as set forth in claim 1 wherein at least one of said phase varying means comprises a center-tapped coil, a capacitor and variable resistor in series bridged across the outer ends of said coil, and means connected between said center-tap and the junction between said capacitor to provide the phase varied output of said phase varying means.

5. A complex wave generator as set forth in claim 1 wherein said plurality of oscillators comprise L–C tuned transistor circuits.

6. A complex wave generator as set forth in claim 1 wherein said plurality of oscillators comprise L–C tuned transistor circuits and including individual variable base bias means for said transistors for adjusting the initial phases of said oscillators.

7. A complex wave generator as set forth in claim 1 and including independent signal amplitude control means connected between said oscillators and said combining means for individual amplitude control of the components of the complex output wave.

8. A complex wave generator as set forth in claim 1 wherein said phase varying means are aperiodic.

9. A complex wave generator as set forth in claim 1 wherein said phase varied synchronizing signals are variable over at least 360 degrees of a given oscillator frequency with respect to a reference phase of said fundamental signal.

10. In a complex wave generator, the combination of, a crystal controlled transistor oscillator for generating a predetermined fundamental frequency signal, a plurality of independently and substantially continuously variable phase shifting means coupled to said oscillator, a plurality of transistor oscillators adapted to oscillate at substantially harmonically related frequencies to said fundamental frequency oscillator, means for synchronizing said oscillators individually by means of signals from said phase shifting means, and amplitude controlled means for combining signals from said fundamental frequency oscillator and said harmonically related oscillators to provide a complex wave output signal.

11. A complex wave generator as set forth in claim 10 wherein said phase shifting means comprise at least two cascaded phase shifting circuits for providing phase shift which is the sum of the phase shift provided by at least two phase shifting means.

12. A complex wave generator as set forth in claim 10 wherein said phase shifting means comprise a center-tapped inductor a capacitor and a variable resistor.

13. A complex wave generator as set forth in claim 10 wherein said synchronizing means include a transistor amplifier driven between substantial cut-off and substantial saturation for providing a substantially constant amplitude synchronizing signal.

References Cited by the Examiner

UNITED STATES PATENTS

| | | | |
|---|---|---|---|
| 2,478,973 | 8/1949 | Mahren | 331—40 |
| 3,100,284 | 8/1963 | Kerns | 328—14 |

ROY LAKE, *Primary Examiner.*

JOHN KOMINSKI, *Examiner.*